United States Patent [19]
Fantone et al.

[11] Patent Number: 6,070,349
[45] Date of Patent: Jun. 6, 2000

[54] MULTI-PURPOSE EASEL FOR DISPLAYING MULTIPLE, 3D, AND ANIMATED IMAGES

[75] Inventors: Stephen D. Fantone, Lynnfield, Mass.; Anthony L. Gelardi, Cape Porpoise; John A. Gelardi, Kennebunkport, both of Me.

[73] Assignee: Insight, Inc., Lynnfield, Mass.

[21] Appl. No.: 09/112,166

[22] Filed: Jul. 8, 1998

Related U.S. Application Data

[60] Provisional application No. 60/053,580, Jul. 24, 1997.

[51] Int. Cl.[7] .................................................... G03B 25/02
[52] U.S. Cl. .......................................... 40/454; 40/661.06
[58] Field of Search .............................. 40/453, 454, 661, 40/661.06, 649, 653, 655; 248/160

[56] References Cited

U.S. PATENT DOCUMENTS

| | | |
|---|---|---|
| 1,220,515 | 3/1917 | Kantro . |
| 1,348,382 | 8/1920 | Smith ................................. 40/661.06 |
| 2,507,975 | 5/1950 | Hotchner . |
| 2,589,735 | 3/1952 | Salfisberg . |
| 2,833,176 | 5/1958 | Ossoinak . |
| 2,915,843 | 12/1959 | Pabst et al. . |
| 3,076,541 | 2/1963 | Volckening . |
| 3,538,632 | 11/1970 | Anderson . |
| 3,568,346 | 3/1971 | Smith . |
| 3,953,869 | 4/1976 | Lo et al. . |
| 3,956,837 | 5/1976 | Itano . |
| 3,973,958 | 8/1976 | Bean . |
| 4,044,889 | 8/1977 | Orentreich et al. . |
| 4,120,562 | 10/1978 | Lo et al. . |
| 4,158,501 | 6/1979 | Smith et al. . |
| 4,255,380 | 3/1981 | Björkland . |
| 4,337,590 | 7/1982 | Jackson ................................. 40/661 X |
| 4,420,221 | 12/1983 | Sparks . |
| 4,480,893 | 11/1984 | Fantone . |
| 4,600,297 | 7/1986 | Winnek . |
| 4,606,553 | 8/1986 | Nickerson . |
| 4,650,282 | 3/1987 | Lo . |
| 4,783,133 | 11/1988 | Chen . |
| 4,863,026 | 9/1989 | Perkowski . |
| 4,869,946 | 9/1989 | Clay . |
| 4,895,252 | 1/1990 | Nomula . |
| 4,903,069 | 2/1990 | Lam . |
| 4,935,335 | 6/1990 | Fotland . |
| 5,018,291 | 5/1991 | Pasquale et al. . |
| 5,101,971 | 4/1992 | Grobecker . |
| 5,113,213 | 5/1992 | Sandor et al. . |
| 5,146,703 | 9/1992 | Boden ..................................... 40/454 |
| 5,174,054 | 12/1992 | Politi . |
| 5,189,531 | 2/1993 | Palmer et al. . |
| 5,244,084 | 9/1993 | Chan . |
| 5,276,478 | 1/1994 | Morton . |
| 5,279,912 | 1/1994 | Telfer et al. . |
| 5,364,274 | 11/1994 | Sekiguchi . |
| 5,390,437 | 2/1995 | Pearson ................................... 40/661 |
| 5,456,033 | 10/1995 | Sachnoff ................................. 40/661 |
| 5,461,809 | 10/1995 | Fowler et al. ........................... 40/655 |
| 5,494,445 | 2/1996 | Sekiguchi et al. ..................... 40/453 X |
| 5,544,741 | 8/1996 | Fantone et al. . |
| 5,588,526 | 12/1996 | Fantone et al. ....................... 40/454 X |
| 5,788,405 | 8/1998 | Beard ................................. 248/160 X |
| 5,857,791 | 1/1999 | Kenney ................................. 40/661 X |

FOREIGN PATENT DOCUMENTS 2222143  2/1990  United Kingdom .

*Primary Examiner*—Joanne Silbermann
*Attorney, Agent, or Firm*—Francis J. Caufield

[57] ABSTRACT

Image display easels are provided with mechanical and optical features that permit them to be used for advertising, marketing, and other such purposes. The easels display multi, 3D, and animated visual effects that can be easily changed as needed by the user while easily achieving the alignment needed for such effects.

25 Claims, 12 Drawing Sheets

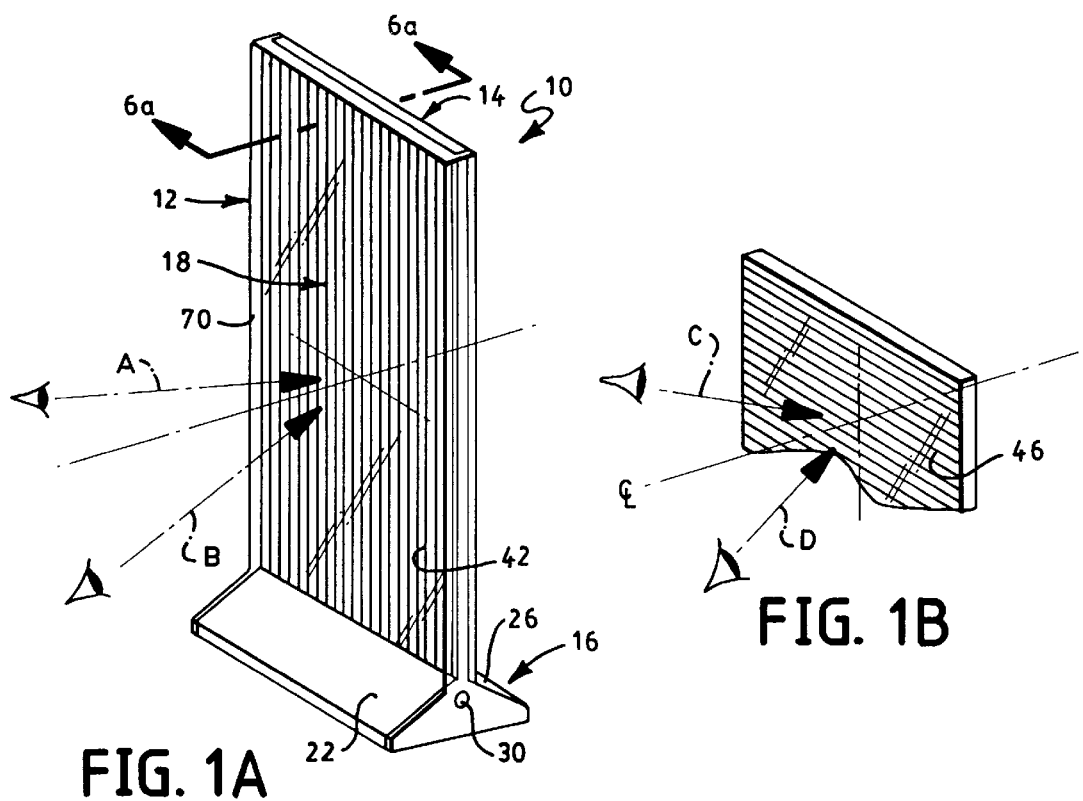
FIG. 1A
FIG. 1B
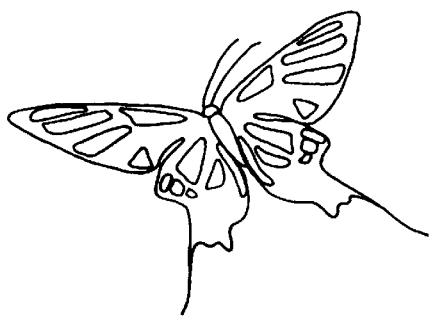
FIG. 2
*Papillon Faire*
*Appetizers*
*Entrees*
*Desserts*
*Beverages*
FIG. 3

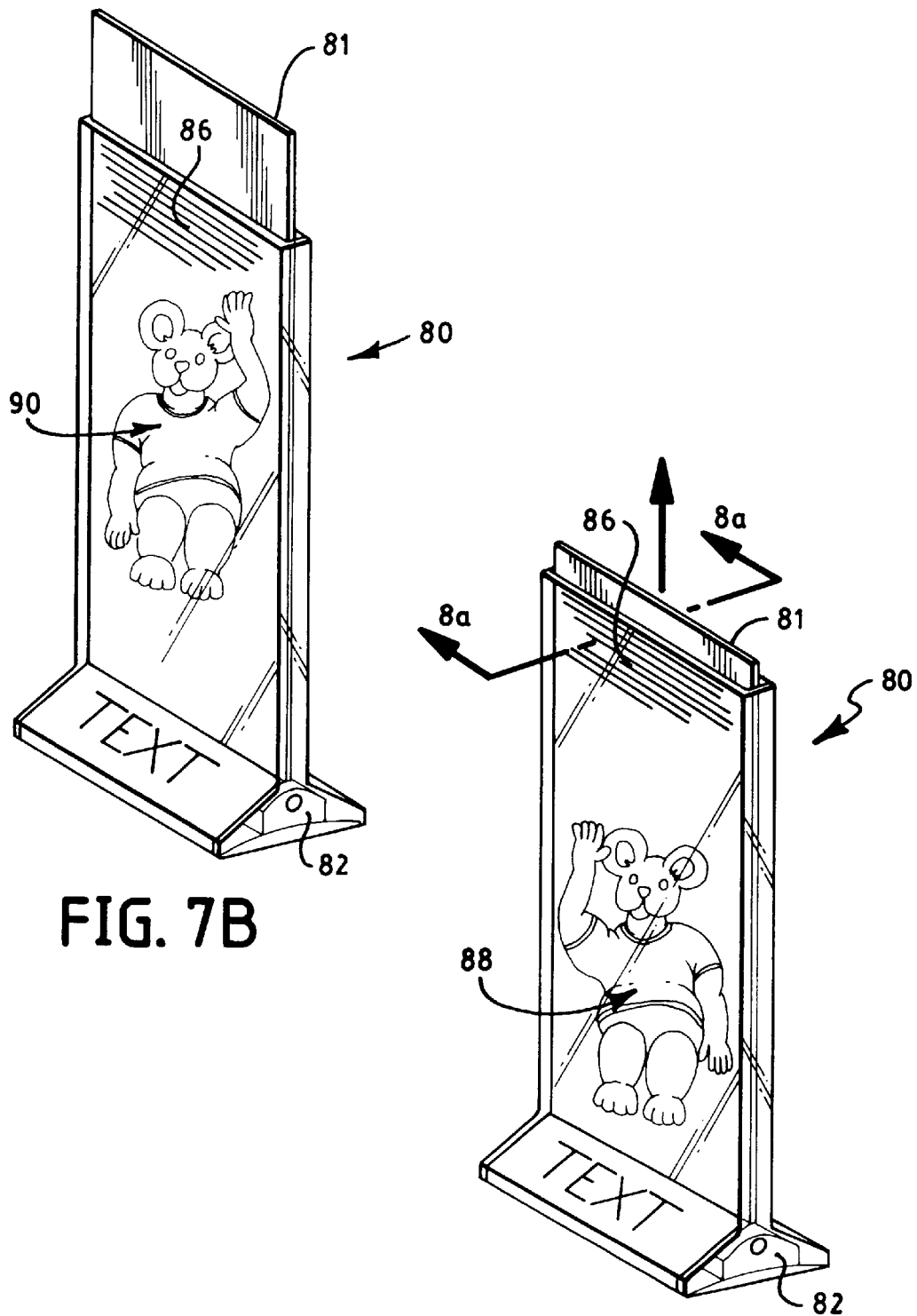

MULTI-PURPOSE EASEL FOR DISPLAYING MULTIPLE, 3D, AND ANIMATED IMAGES

CROSS REFERENCE TO RELATED APPLICATION AND PATENT

This application claims priority from commonly owned U.S. Provisional Patent Application Ser. No. 60/053,580 filed on Jul. 24, 1997. Attention is also directed to commonly owned and related U.S. application Ser. No. 08/772,968, filed Dec. 23, 1996, the entire disclosure of which is herein incorporated by reference.

BACKGROUND OF THE INVENTION

1. Field of the Invention

This invention relates generally to easels for displaying images and, more particularly, to optical and mechanical arrangements by which images in easels can be conveniently updated while providing enhanced views and special effects of information such as graphics, photographs, alphanumeric data, and/or other symbolically coded information.

2. Description of the Prior Art

The use of frames for displaying images is a well-established practice. As is well-known, frames play a major role in the visual impact that an image can have; they isolate the important subject matter from its surroundings to focus the viewers attention, aid in composition, and, if carefully chosen, can compliment the contents of an image.

Over the years, any number of materials have been used for frame construction including wood, ceramics, plastics, and metals. Configurations have included those that are adapted to hang from walls, sit on flat surfaces like an easel, or attach to metal surfaces via magnets. Use has also been made of plastic injection molding techniques to fabricate frames.

As visual communications continue to develop and proliferate at ever increasing rates, easels occupy an even greater role in the display of information than they ever had in the past. New technologies in image processing, acquisition, and generation continue to expand and drive the need for convenient and readily adaptable easel modalities that can used with a variety of image generation techniques, as well as the more traditional ones such as photography.

In addition, the number of images available and their use with other types of information such as alphanumeric data, or coded information, have created a need to be able to display as much visual information as possible per unit of display area. Consequently, the display of multiple images via the same display area has become an important requirement for display technology.

While optical approaches have been used in the past for direct magnification of content information about the insides of containers, none have provided more visual access to more information on the same viewable area or, more importantly, different information viewable through the same box surface. For example, British Patent No. GB 2222143 entitled "BOX-LIKE CONTAINER" published on Feb. 28, 1990 discloses the use of a plano-convex, positive cylindrical lens arranged along the hinge edge of a tape cassette or compact disc box for purposes of providing magnification of informational matter carried directly behind it.

U.S. Pat. No. 4,863,026 entitled "STORAGE CASES FOR INFORMATION RECORDING DEVICES", issued on Sep. 5, 1989 discloses a Fresnel lens incorporated in or on the front cover panel of a case for purposes of magnifying information carried on the surface of a program card inserted in the case such that it lies directly beneath the lens.

In like manner, U.S. Pat. No. 4,044,889 entitled "COSMETIC CONTAINER INCLUDING INTEGRATED LENS STRUCTURE", issued on Aug. 30, 1977, also shows a Fresnel lens for magnifying tiny underlying information carried on the interior of a cosmetic container.

U.S. Pat. No. 4,863,026 entitled "STORAGE CASES FOR INFORMATION RECORDING DEVICES", issued in the name of Thomas J. Perkowski on Sep. 5, 1989, discloses a Fresnel lens arranged on the front cover of a magnetic tape, video tape, or compact disc storage box for magnifying information located directly behind the front cover at an appropriate distance.

Similarly, U.S. Pat. No. 4,044,889 entitled "COSMETIC CONTAINER INCLUDING INTEGRATED LENS STRUCTURE", issued to Seymour Orentreich et al. on Aug. 30, 1977, describes the use of Fresnel lens structures for magnifying information located on the interior surfaces of cosmetic containers.

U.S. Pat. No. 5,189,531 entitled "HOLOGRAM PRODUCTION", issued to Charles E. Palmer et al. on Feb. 23, 1993, describes techniques for forming holographic images in cosmetic compact covers or compact audio or video discs or the like.

U.S. Pat. No. 5,494,445 entitled "PROCESS AND DISPLAY WITH MOVEABLE IMAGES" issued to Yoshi Sekiguchi, et al. on Feb. 27, 1996 shows at FIGS. 99–102 stands for displaying multiple images.

In spite of the known art, there continues to be a demonstrable need for more effective displays for providing significantly improved visual access to the quantity and variety of images currently available for aesthetic and commercial informational purposes. And, it is a primary object of this invention to fulfill this need.

SUMMARY OF THE INVENTION

Another object of the present invention is to provide optical and mechanical arrangements by which the viewable surfaces of flat display frames may be exploited to provide views of different information by observing those surfaces from slightly different perspectives in easel configurations suitable for table top use such as in a restaurant, night club, bars, or similar such uses.

Yet another object of the present invention is to provide optical viewing arrangements for display easels that can be fabricated and assembled via high speed production machinery.

Still another object of the present invention is to provide optical display arrangements by which pseudo-dynamic information (animation and the like) may be provided to an observer of a flat image display area.

Another object of the present invention is to provide an optical arrangement employing a lenticulated surface structured to compensate for parallax effects at customary viewing distances.

Still another object of the invention is to provide easels that can easily be configured to fit a variety of image presentation needs.

Other objects of the invention will be apparent and will appear hereinafter in the following detailed description when read in connection with the drawings.

Accordingly, this invention provides an image easel system for presenting multiple images to an observer; this easel system comprises a printed insert card having formed thereon at least one pair of interlaced images; a pair of structural members each of which includes a vertically extending panel having a leg section angularly dependent therefrom, the structural members having complementary configured means for pivotally mounting them with respect to one another for movement between an open extended position and a closed position. At least one of the panels includes at least one transparent lenticulated section optically associated therewith. The pair of structural members further includes means for aligning the interlaced images so that the images are in a plane substantially parallel to and in optical registration with the transparent lenticulated section, the insert card and the transparent lenticulated section being structured and arranged with respect to one another to provide different images to an observer looking at the transparent lenticulated section from different angular perspectives. The image easel system also comprises means for continuously biasing the structural members against one another so that they tend to remain in their closed position to retain the printed insert card in alignment with the transparent lenticulated section.

This invention also provides an image easel system, for use with a printed insert card bearing at least one pair of interlaced images, this easel system being used to present multiple images to an observer. The image easel system comprises a pair of structural members each of which includes a vertically extending panel having a leg section angularly dependent therefrom. The structural members having complementary configured means for pivotally mounting them with respect to one another for movement between an open extended position and a closed position. At least one of the panels includes at least one transparent lenticulated section optically associated therewith. The pair of structural members further includes aligning means for contacting at least one edge of the card so that the images on the card are in a plane substantially parallel to and in optical registration with the transparent lenticulated section so as to provide different images to an observer looking at the transparent lenticulated section from different angular perspectives. The image easel also comprises means for continuously biasing the structural members against one another so that they tend to remain in their closed position to retain the card in alignment with the transparent lenticulated section.

BRIEF DESCRIPTION OF THE DRAWINGS

The structure and operation of the invention, together with other objects and advantages thereof, may best be understood by reading the detailed description in connection with the drawings in which unique reference numerals have been used throughout for each part and wherein:

FIG. 1a is a diagrammatic perspective of an inventive easel system having a vertically oriented lenticulated front panel;

FIG. 1b is a diagrammatic perspective of a fragment of a lenticulated panel that can be used in an inventive easel and has its lenticules running horizontally;

FIG. 2 is a diagrammatic vertical elevational view of an alpha-graphic image that may be presented to an observer looking along a first path of observation at the front cover of the easel system of FIG. 1;

FIG. 3 is a diagrammatic vertical elevational view of a textual image that may be presented to an observer looking along a second path of observation, angularly separated from the first in the horizontal plane, when looking at the front of the easel system of FIG. 1;

FIGS. 7a and 7b are diagrammatic perspectives of another embodiment of the inventive easel adapted to generate pseudo-dynamic or animated views.

DETAILED DESCRIPTION OF THE INVENTION

Figure 4:
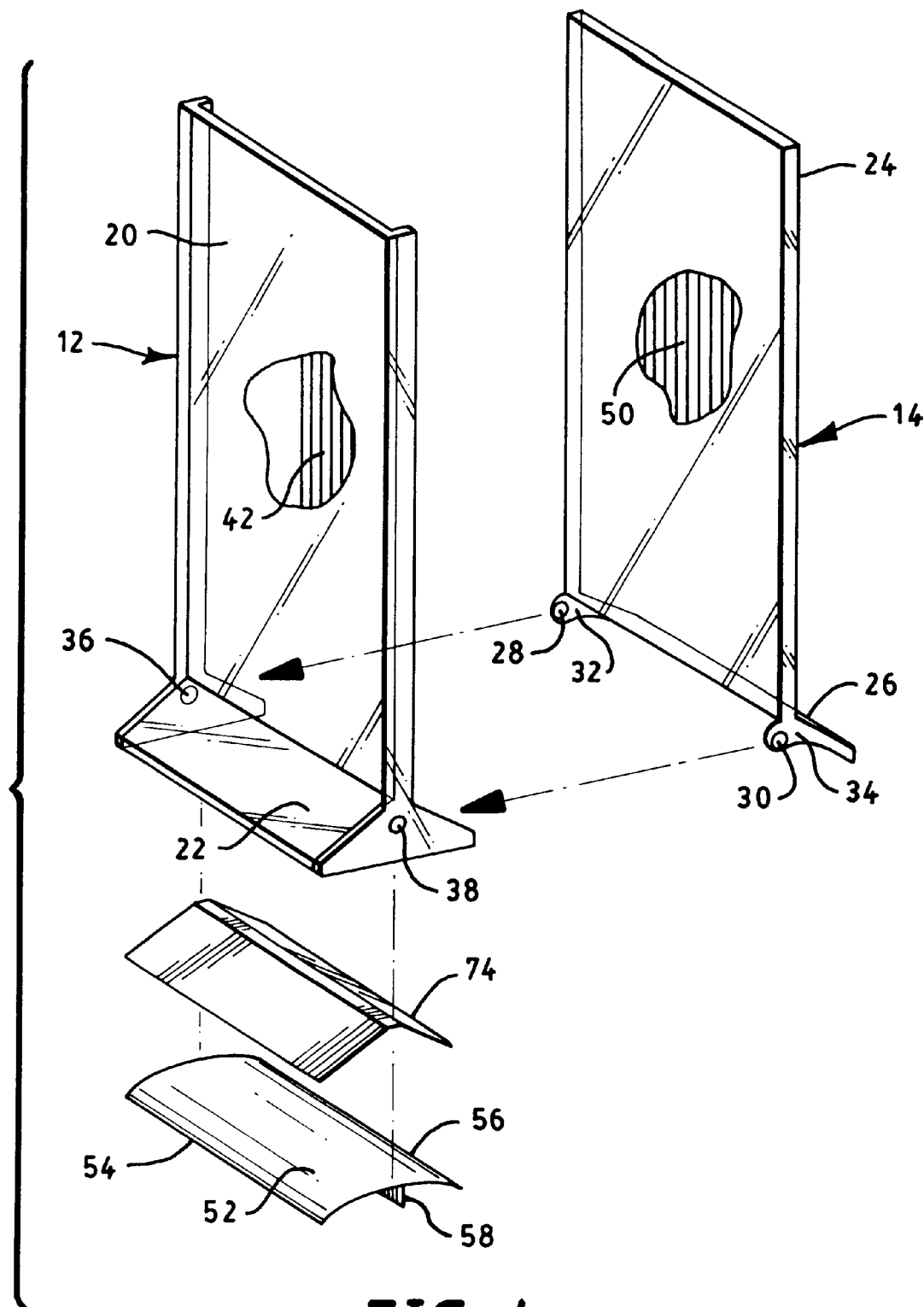
FIG. 4 is a diagrammatic, exploded perspective view of the easel system of FIG. 1.

The present invention relates to easel systems for displaying multi-, 3D, animated images, and the like. Its various embodiments are especially adapted to permit the information content of the chosen images to be changed for advertising, marketing, or other purposes thereby serving as a useful means for varying messages. The images themselves may contain graphical, pictorial, photographic, textual, or mixtures of these elements. Their are two basic embodiments of inventive easels. The first to be described is the static version and the second the action or animation version in which the displayed images move.

Referring now to FIG. 1, there is shown a first preferred embodiment of the inventive easel system designated generally at 10. As seen best in FIG. 4, easel system 10, which is preferably generally rectangular in shape (although it may be square or of some other sensible shape), comprises two major structural members 12 and 14 that pivotally "snap-fit" together in a manner to be described to a base section 16 and a display section 18, which vertically extends upwardly from base section 16 when the base section of easel 10 is placed on a flat surface.

Each of the structural members 12 and 14 has a vertically extending panel and a generally rectangular leg section which depends from the vertical panel at a predetermined angle. As will be seen, the leg sections form the base of the easel and also serve as a means for displaying messages other than those visible through the display section 18.

As best seen in FIG. 4, member 12 comprises vertical panel 20 and depending leg section 22 while member 14 comprises vertical panel 24 and depending leg section 26. Approximately at the intersection of outboard sides of vertical panel 24 and leg section 26, there are provided a pair of spaced apart journals 28 and 30 that are formed on corresponding flexible arms 32 and 34, respectively.

On member 12, there are provided a pair of spaced apart bearing holes 36 and 38 that are adapted to receive journals 28 and 30, respectively, so that members 12 and 14 can be pivotally attached to one another by "snap-fitting" them together.

Figure 6A:
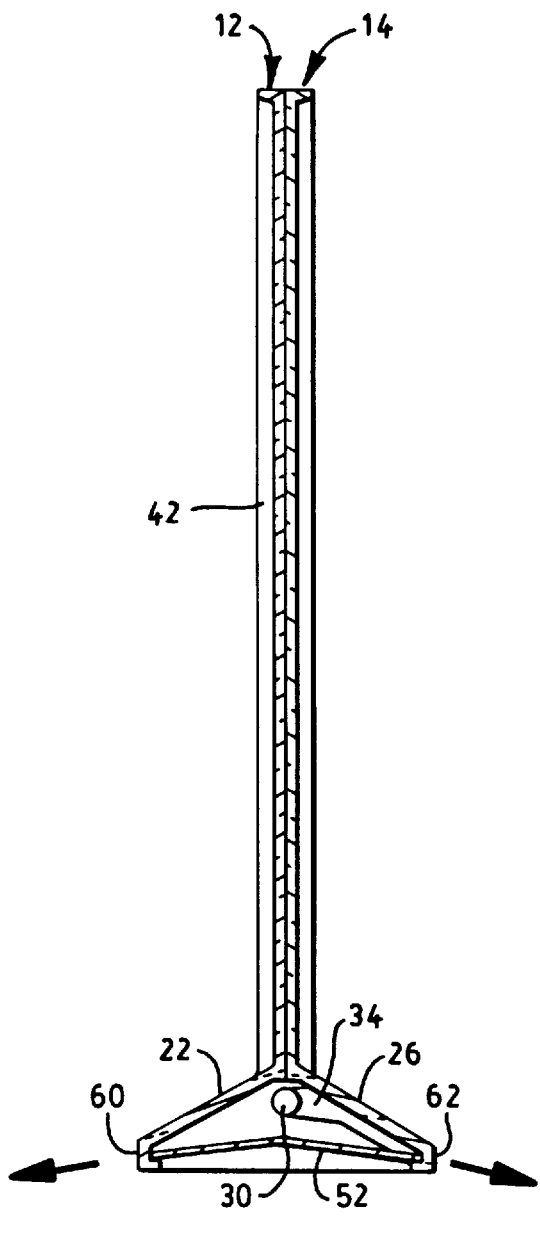
FIG. 6a is a diagrammatic vertical elevational view, partially in section (along Line 6a—6a of FIG. 1), showing the inventive easel in its closed position where it is holding an image bearing card in alignment with the lenticules of its vertical panel.
Figure 6B:
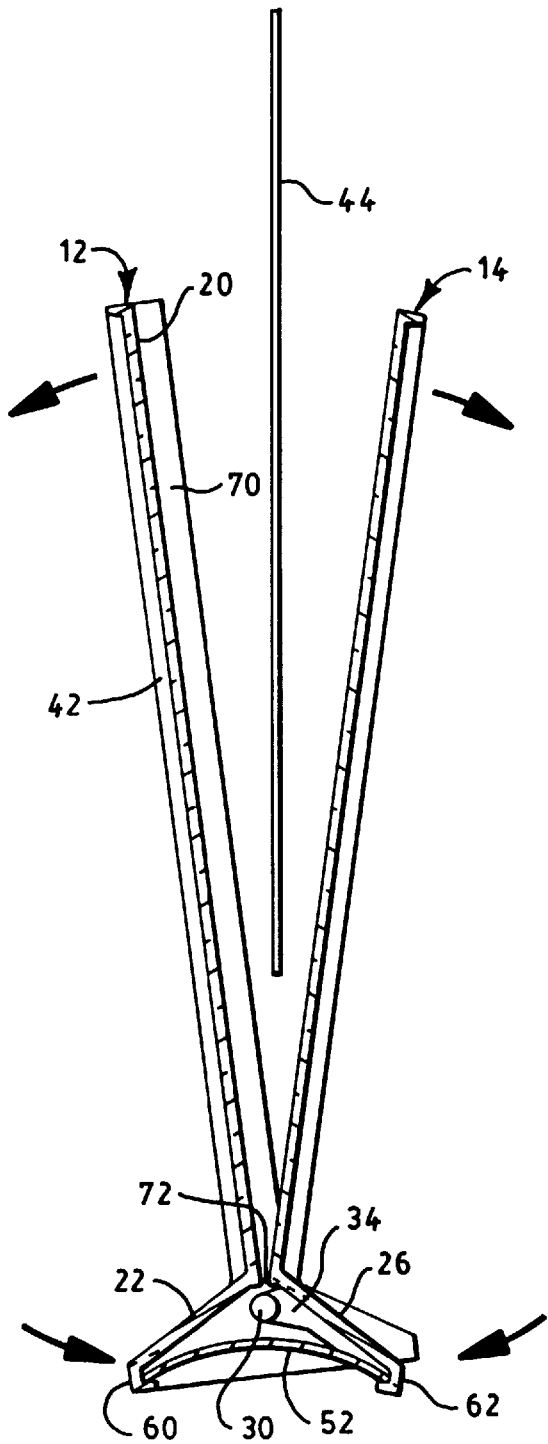
FIG. 6b is similar to FIG. 6a except that the inventive easel is in its open position, vertical panels spaced apart and base panels closer together, to permit insertion or removal of an original or replacement image bearing card.

As best seen in FIGS. 6a and 6b, flexible arms 32 and 34 are provided with stop sections 40 (only one shown), which permit members 12 and 14 to be pivotally moved with respect to one another between a closed position as shown best in FIG. 6a and an open position as illustrated in FIG. 6b.

Figure 5:
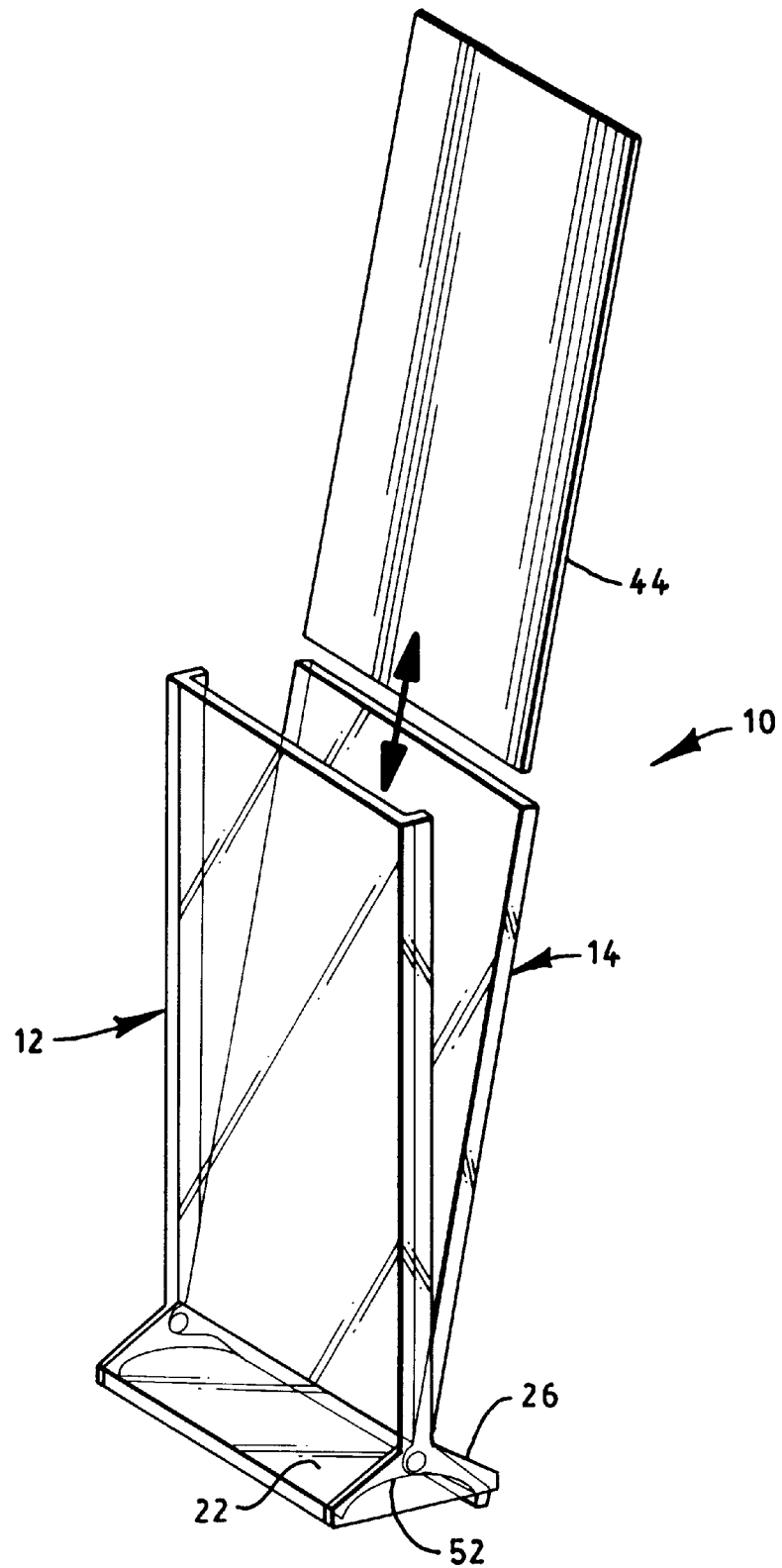
FIG. 5 is diagrammatic perspective view of the easel of FIG. 1 shown in its open position along with an image bearing card that can be thought of a either in the process of being inserted or removed from the easel.

Again referring to FIG. 1, vertical panel 20 is provided with a plurality of vertically extending lenticules 42 that are optically configured to project two or more interlaced images formed on an image carrying card 44 (See FIG. 5 and 6b) toward a viewer so that the viewer sees different images when viewing the easel from different angular perspectives or 3D images when viewing the easel from one perspective. One of the images may be, for example from perspective A, a restaurant logo as shown in FIG. 2 while the other from perspective B may be the restaurant menu as illustrated in FIG. 3.

The lenticules may also be horizontally oriented as illustrated by those designated as 46 in FIG. 1b in which case the perspectives, in the case of multiple images, may be from above and below the centerline, CL, where they are designated at C and D. It should also be recognized that image carrying card may have images on both sides in which case the vertically extending panel of member 14 may also be provided with lenticules such as those designated at 50 in FIG. 4 in the case where multiple image effects also are to be displayed from both sides of easel 10. It will also be appreciated that multiple image effects may be displayed from one side while ordinary 2D images are displayed from the other, in which case the corresponding vertical panel is planar. In addition, it is contemplated that only predetermined portions of the vertical panels would be provided as lenticular sections while others remain planar and the lenticulated sections in any event do not have to be just vertically or horizontally oriented but may take on other angular orientations.

The easel members are further adapted to automatically align the interlaced images with the lenticular panels of the invention by virtue of a number of alignment features in combination with a clip-like action that presses image bearing card 44 against a corresponding lenticular panel to place the images at the focal plane of the lenticulars. The clip action is provided by a biasing spring 52 (FIG. 4), which can be fabricated of a suitable engineering plastic or metal material. Spring 52 has ends 54 and 56 and a depending leg 58, which helps provide stability to easel 10. Ends 54 and 56 fit into corresponding grooved sections, 60 and 62, respectively, formed in leg sections, 22 and 26, respectively. The length of spring 52 is chosen so that when its ends 54 and 56 are seated in grooved sections 60 and 62, vertical panels are biased into their closed position shown in FIG. 6a. Therefore, when an image bearing card is present between vertical panels 20 and 24, any images it carries are pressed firmly against the rear surfaces of panels 20 and 24 so as to be in the plane of any lenticulars present.

In addition to being in alignment with respect to the focal plane of any lenticular panels, interlaced images in image carrying card 44 are further aligned so that acceptably parallel, within tolerances, to the longitudinally extending axes of the lenticulars carried on the vertically extending panels 20 or 24. For this purpose, panel 20 is provided with (See FIG. 6b) two vertically extending flanges (only one shown at 70) and a horizontally extending flange 72. These three flanges in combination with the rear surface of panel 20 define a nest dimensioned to receive panel 24 so that its rear surface is biased against the rear surface of panel 20. When an image bearing card is placed in this nest, its bottom edge due to gravity butts up against the upward surface of flange 72. By prearrangement, the lower edge of card 44 serves as a reference edge with which the interlaced images it carries have been aligned have been aligned with either the vertical or horizontal, as the case may be, to be either acceptably parallel or perpendicular thereto. Thus, when an image bearing card 44 is placed in the "nest" its bottom edge butts up against the top surface of flange 72 whereupon, the images it carries are properly oriented with respect to the longitudinally extending axes of the lenticules. When the easel is closed the alignment of the interlaced images is complete, yet a card with other images may be easily substituted for a prior one with equal alignment achieved.

In addition to images carried on card 44, provision has been made for additional information to be carried on another graphic insert element 74 that is placed into the base section 16 to be in alignment with the transparent legs as shown best in FIG. 4.

Structural members 12 and 14 are preferably molded of a transparent, durable plastic such as styrene or polycarbonate and including the transparent, flat, lenticulated panels which they carry. The lenticules themselves are preferably vertically or horizontally oriented and make up lenticular arrays or sections. While lenticules 42 are shown enlarged many times, it will be appreciated that in practice they are small, having spatial frequencies ranging between, for example, 1 to 10 lenticules per millimeter.

Information, which may be in the form of interlaced printed images, resides in a plane behind lenticulated panel 18, and lenticulated panel 18 operates in a manner to be described to provide an observer with two different images depending on the angle at which easel 10 is observed. Because of the vertical orientation of lenticules 42, the two available views are separated in angle in a horizontal plane perpendicular to easel 10 as previously described.

While two separate views have been illustrated in connection with the description of the embodiment of FIG. 1a, it will be appreciated that more than two views are quite feasible, depending on the number of interlaced images provided. It should also be appreciated that such views can periodically repeat themselves as the angle of view over the surface of the lenticulated surface changes.

Each lenticule 42 operates in a well-known manner as a cylindrical lens to form line images in one azimuth corresponding to its longitudinally extending axis. Image support or information card 44 preferably bears an interlaced image, i.e., the images of the various views to be presented to a viewer broken up into tiny adjacent image strips, alternately one image segment form one view and so on over the entire image. Such interlaced images are placed behind lenticules 42 so that different combinations of them can be seen along the different perspectives; each lenticule 42 providing a view of part of the whole image which collectively are perceived as a synthesized whole by the observers visual system without notice of the individual lenticules themselves because of their size in relation to the visual acuity of the eye.

The image support or informational card 44 may be positioned laterally and vertically through the expediency of the rectangular format of the preferred embodiment of easel 10. However, it will be understood that other shapes for the display may also be used. For example, squares or other polygonal shapes or other geometries with a finite number of axes of symmetry would be suitable. Circular mounts and artwork can be accommodated by introducing simple keying or orienting features which locate the artwork relative to the lenticules.

Advantageously, base 16 may be made of different colored material to create special color effects.

Figure 12:
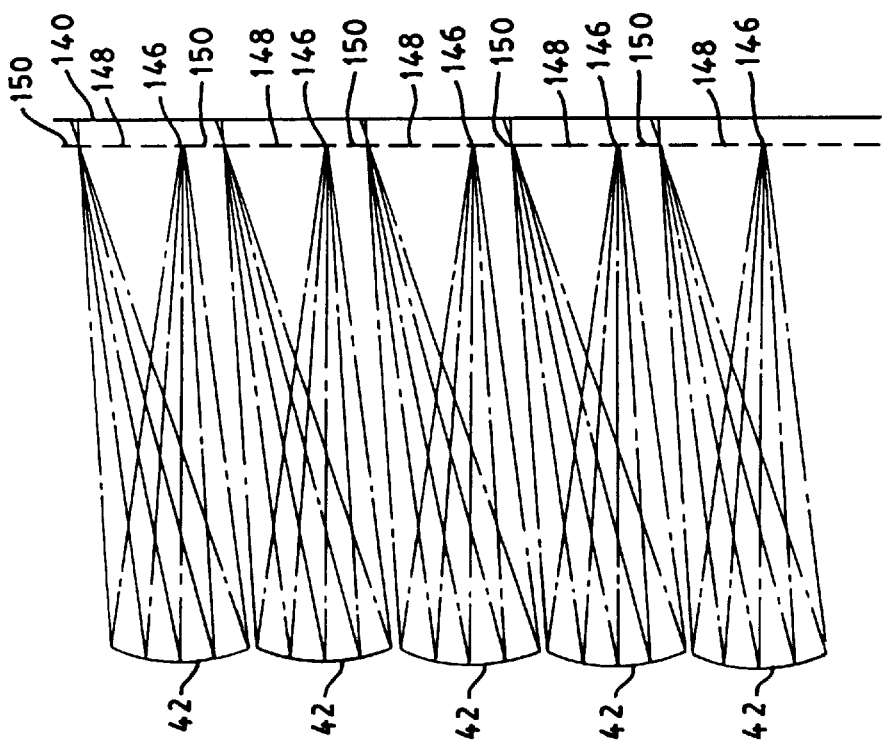
FIGS. 11 and 12 are diagrammatic drawings taken transverse the longitudinal axes of lenticulated panels used in the inventive easel systems, tracing the paths various light rays take in traveling to different segments of interlaced images formed on image bearing cards used in the inventive easel systems.
Figure 11:
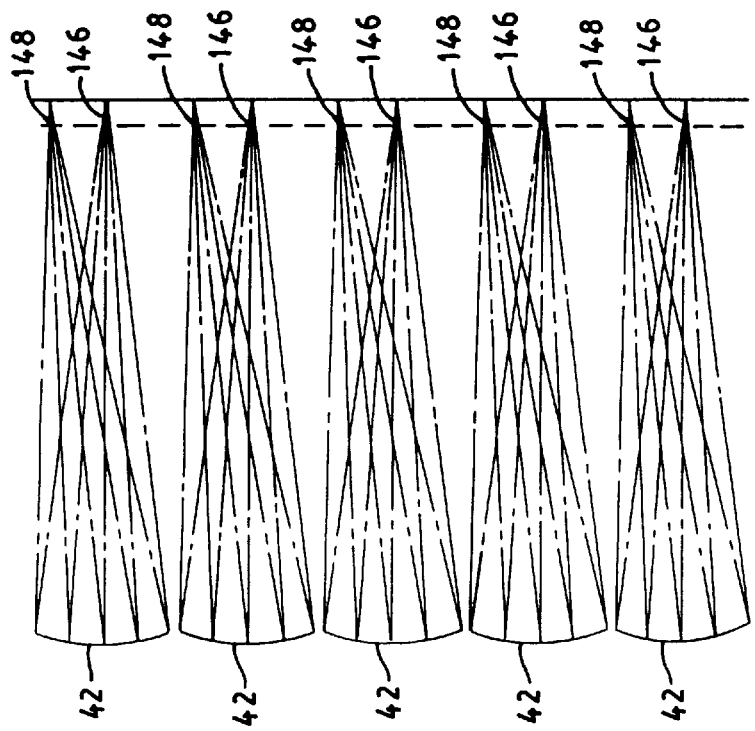

FIGS. 11 and 12 show the principle of operation of the lenticular panels used in the easel systems of the invention. Both figures are traces illustrating the paths that certain light rays take in traveling from different portions of the interlaced images used in the invention to provide the different views for a particular lenticule design. Here, the ray traces were done for lenticules 42 that are made of styrene with an index of refraction of 1.59, have a radius of 0.0285 inches (0.72 mm), and an apical focal distance of 0.058 inches (1.47 mm), i.e., the distance from the front surface on the axis to the optimal focus of a lenticule, here the dashed line, which represents the interlaced image.

In FIG. 11, an observer looking straight along the axis of lenticules 42 sees behind each lenticule 42 a different segment of the whole image where each segment is designated at 146. If the observer looks along a line of sight that is at 10 degrees with respect to the axis, image segments designated at 148, which correspond to a different image, can be seen while those designated at 146 cannot.

In FIG. 12, image segments 150 are seen at an angle of observation inclined to the axis at 20 degrees so this may represent yet another message or a repeat of a previous message or image slightly shifted.

Figure 13:
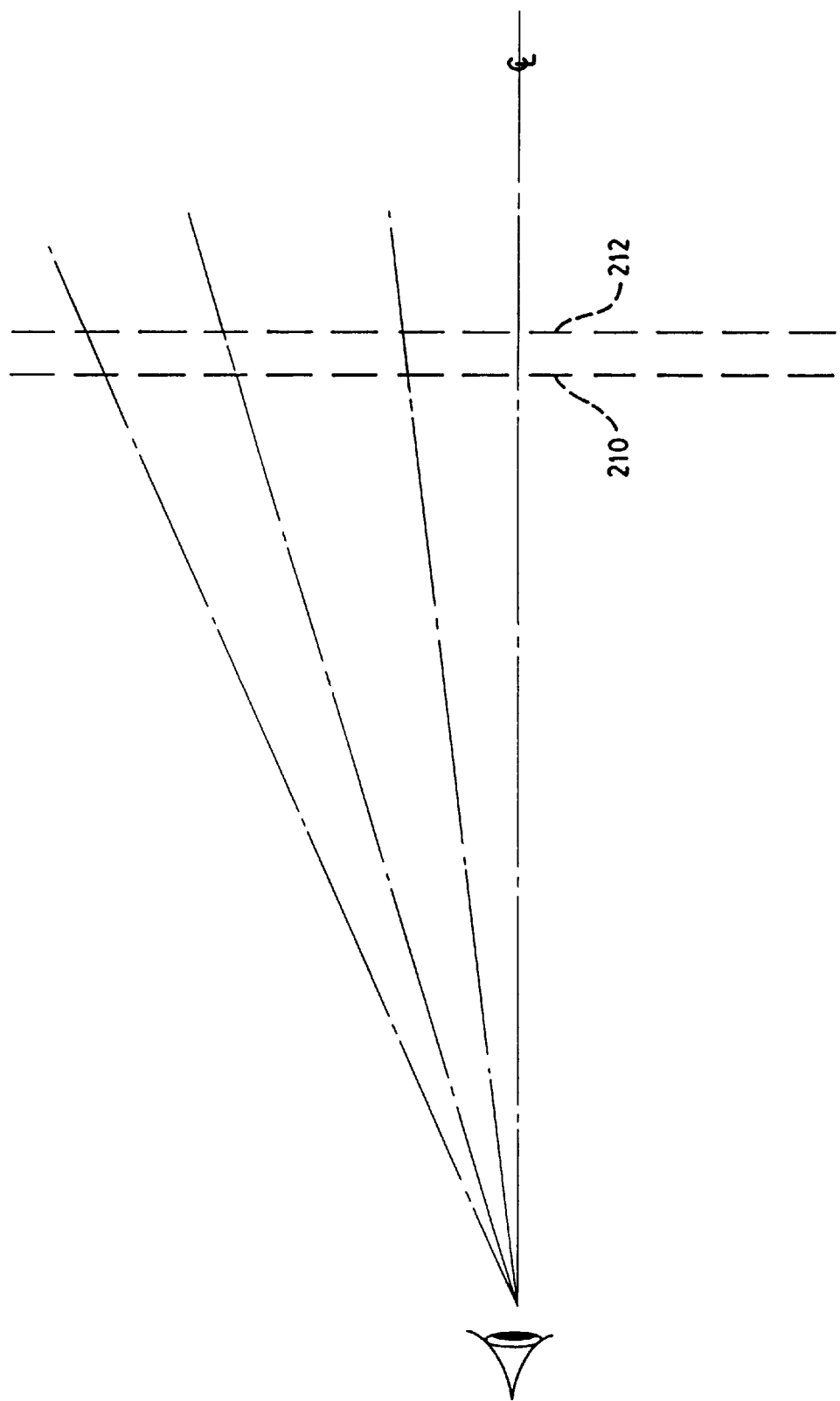
FIG. 13 is a diagrammatic view illustrating the nature of parallax effects that are corrected by certain features of the invention.

Reference is now made to FIG. 13, which illustrates the parallax effect that can occur in using the invention if the size of the display area becomes large in relation to the interpupillary distance of the eye or the viewing distance is correspondingly small in relation to the overall image size. The parallax effect comes about because of a displacement of the chief ray passing through the center of each lenticule 42 with respect to its corresponding image segment as the angle of observation of a lenticule increases compared with the normal to that lenticule. The result is that every chief ray, if not corrected for this effect, does not pass through its correct interlaced image segment. The visual result is a softness or blurriness in changing from one view to the next, or poor separation between views. The phenomenon is shown heuristically in FIG. 13. Let 210 represent the lenticules with a given spacing (assume thin lens theory applies) and 212 represent the interlaced images at the same spatial frequency of the lenticules. Here, the dashes for the interlaced images in 212 can comprise just one image or several images in the allocated space. For purposes of the illustration, they can be assumed to represent one image segment, but the argument applies if they represent more than one.

As can be appreciated, the lenticules and images line up perfectly just like one picket fence behind another, and when one looks through a lenticule normal to it (the lenticules are transparent), one sees a corresponding image segment right behind it. However, when viewing 212 at some angle other than normal incidence, it is clear that one no longer sees the proper corresponding image segment. Instead, the line of sight begins to walk away from the proper image segment as the viewing angle increases until the proper image is missed altogether. This results in a partial view of both images simultaneously, a generally undesirable result.

Figure 14:
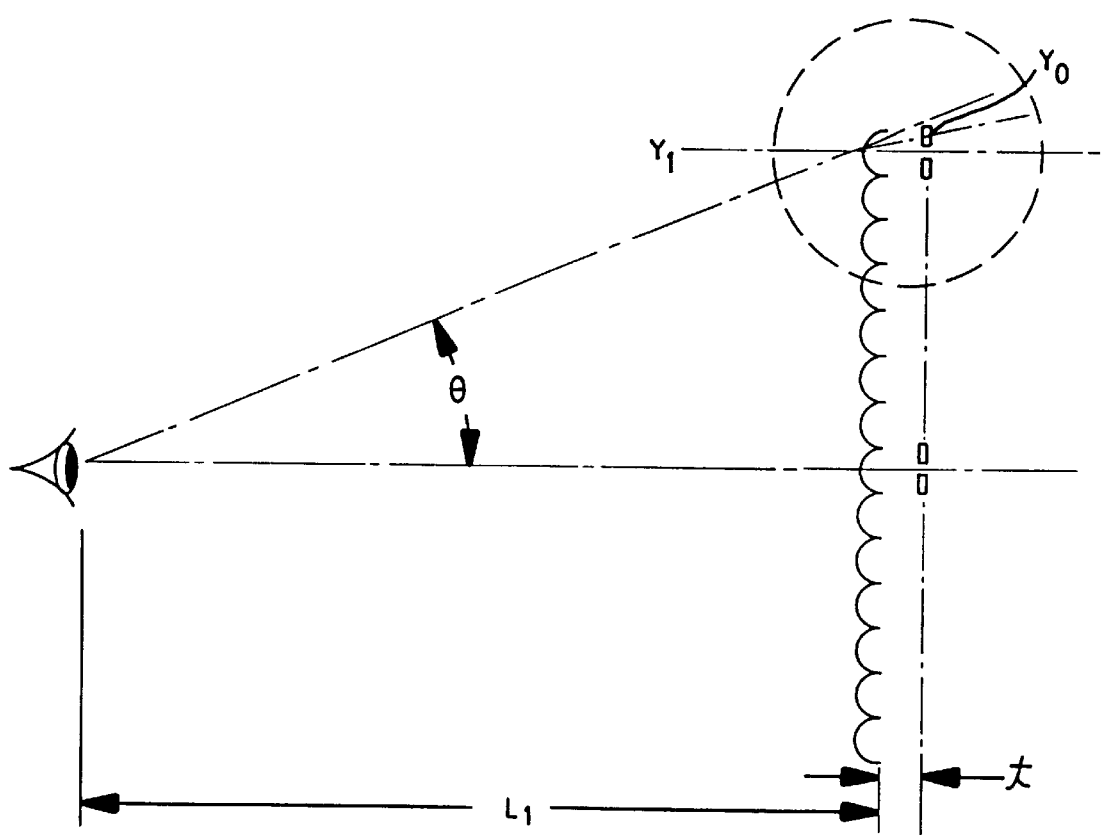
FIG. 14 is a diagrammatic illustration showing in more detail how the parallax effects of FIG. 13 occur as a result of differences in the angle of perspective from which an observer "sees" different segments of interlaced images of the invention.
Figure 15:
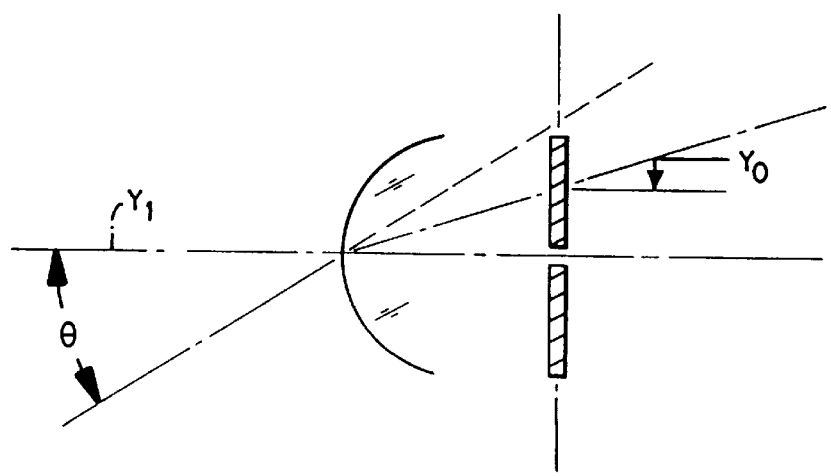
FIG. 15 is a diagrammatic illustration showing the origins of a visual parallax effect that exists without the corrective features of the invention.

FIGS. 14 and 15 show in more quantitative terms exactly by what amounts the chief ray "walkoff" problem is. More particularly, let $y_o$ be the ray height of the chief ray for any lenticule as a function of the angle of observation, θ and vertical position of the y-intercept of an incoming ray. Then $θ_o=θ/n$, where n is the index of refraction of the lenticular material and $L_1$ is the viewing distance. Then, $$y_o=y_1(1+t/nL_1)$$

If one lets, $f_o$=the spatial frequency of the interlaced images, then to compensate for the progressively larger errors in $y_o$ with increasing viewing angle, then, $f_1$, the spatial frequency of the lenticules is given by:

$$f_1=f_o(1+t/nL_1)$$

Thus, the parallax effect may be compensated for exactly for any assumed viewing distances or optimized over a range of viewing distances.

While the preferred way of correcting for parallax effects is to increase the spatial frequency of the lenticules to progressively drop the center of each lenticule downwardly with increasing angle, it is to be understood that the spatial frequency of the artwork may also be adjusted or both can be altered to address the parallax problem. However, it is somewhat easier to build the correction into the molding tool and use available printing techniques to achieve the spatial frequency of the interlaced images. In addition, it will be understood that the foregoing theory can be adapted to correct for any "offset" between an observers line of sight (assume for example from a seated position) and the position of an easel 10 (say placed on a table). However, this correction would only come into play where such an "offset" occurred more often than not or was permanent.

Figure 16:
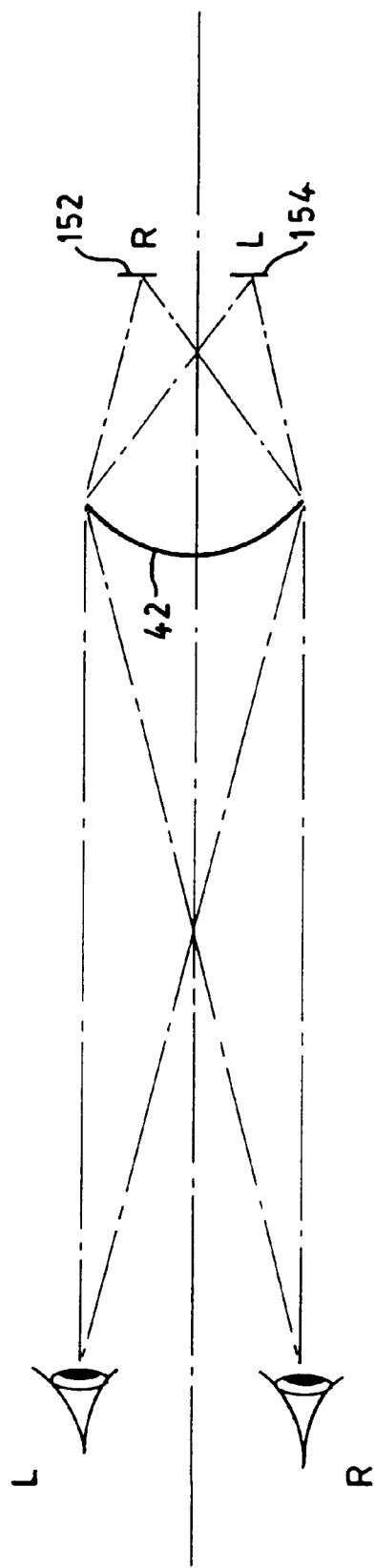
FIG. 16 is a diagrammatic plan view illustrating the principle of operation of the lenticulated surfaces of the invention used for presenting stereo images.

FIG. 16 diagrammatically shows how the interlaced images and lenticules may be used to provide stereo image sets, such as stereo pairs, so the view of the display system front cover may be a stereo image. Here, the system is arranged so that the left eye sees a left stereo image segment behind the right side of a lenticule 42 while the right eye sees a right stereo image segment behind the left side of a lenticule 42 The overall effect is for the right and left eyes to have presented to them fall left and right stereo image pairs. Here, again, parallax effects can be corrected in the manner previously described. If it is desired to provide special effects that simulate morphing, then the interlaced images should be made to slightly overlap so that, as the display rotates past the visual system, the images gradually blur from one to another.

Referring back now to FIGS. 7a and 7b, there is illustrated another preferred embodiment of the easel system of the invention. With this embodiment, designated generally at 80, the presentation of animated images are possible as a result of the presence of modifications and additions that are not present in the first described embodiment. With the exception of the modifications and additions to be described, it can be assumed that other elements remain essentially unchanged with respect to the first described embodiment so common elements will retain their prior numerical designation.

Figure 8:
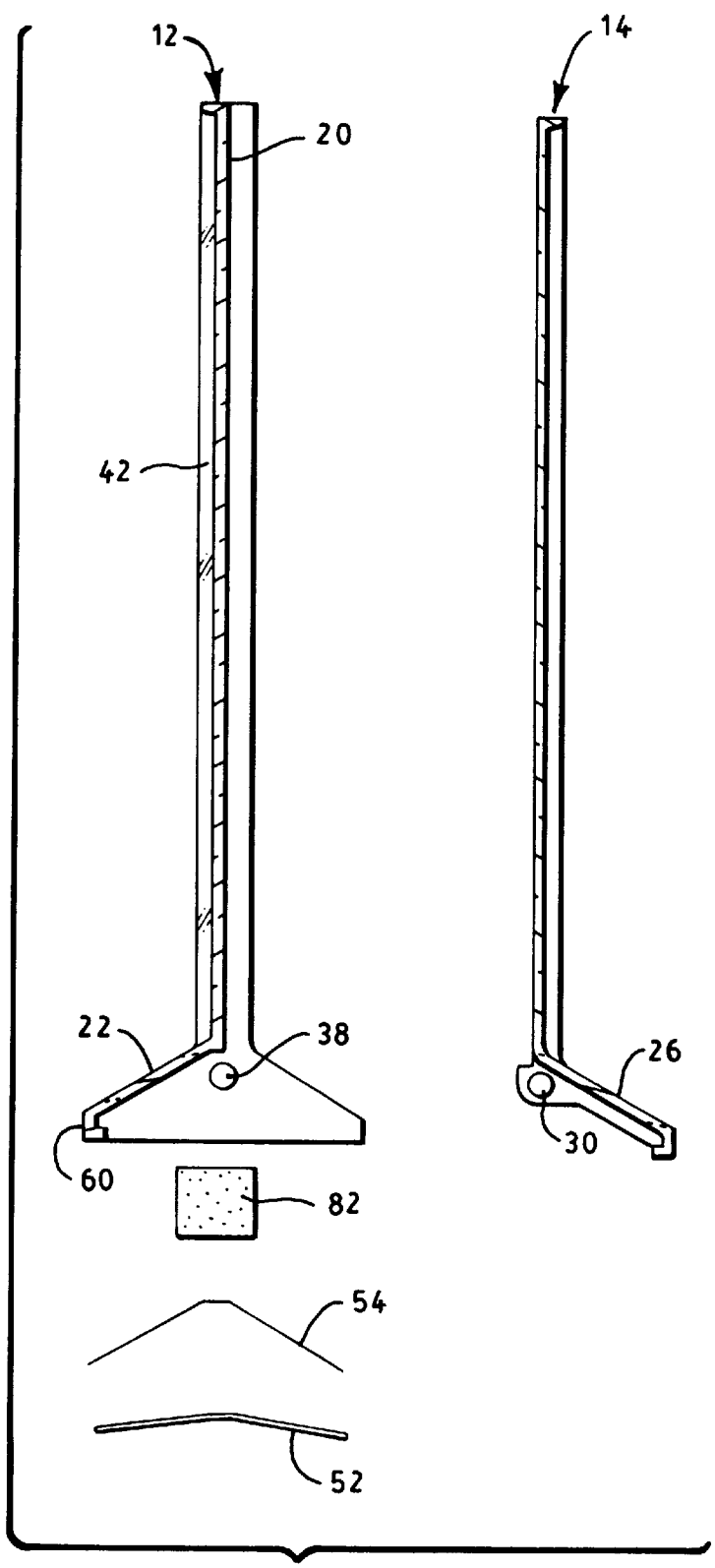
FIG. 8 is a diagrammatic, vertical section taken generally along line 8a–8a in FIG. 7a, showing the major components of FIGS. 7a and 7b in exploded fashion.
Figure 9A:
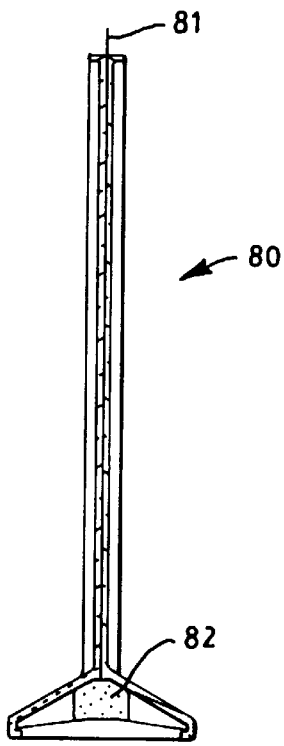
FIG. 9a and 9b are, respectively, diagrammatic side and front elevational views showing an image bearing animation card at the end position of its upward travel.

There are three major differences in easel 80 which are responsible for creating animated effects. The first is the addition of a resilient means, 82 as best seen in FIG. 8. A resilient means is preferably fabricated of open celled foam block and is placed between the graphic element 74 and the bottom surfaces of leg sections 22 and 26 as illustrated in FIG. 9a. Open celled foam has been used for its excellent memory and slow recovery from deformation. Materials that are equivalent to it may be used or a mechanical equivalent spring with similar properties or a suitable mechanical or electromechanical means may be used. However, open-celled foam has been found to be simple, but efficient and cost effective method for the function it provides. Next, a new image bearing card 81 is provided. Card 81 is longer than prior card 44 so that it normally extends above top of easel 80 as shown in FIG. 7b. Card 81 is preferably made of a rigid stock that will tolerate a manually applied downward compressive force or be placed on a thin carrier with the images properly aligned that will provide similar functionality.

Figure 9B:
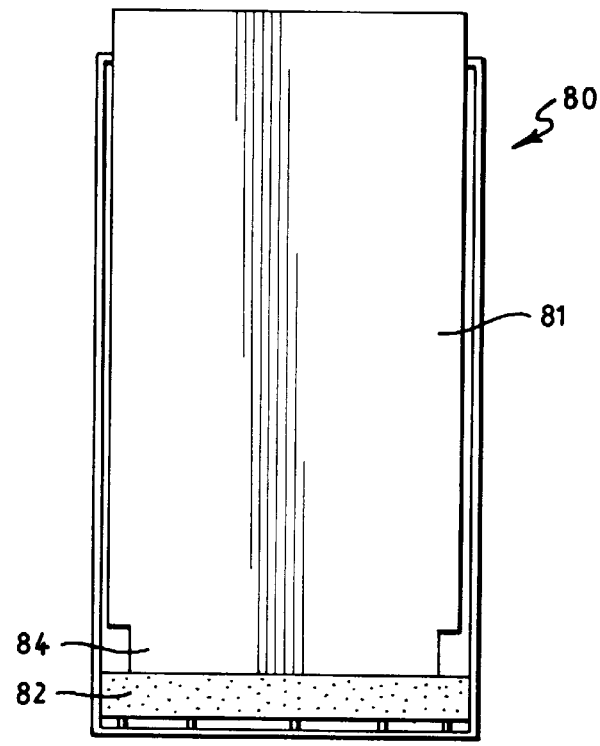
Figure 10A:
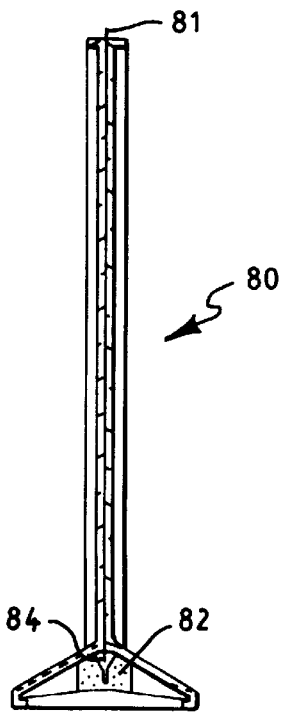
FIGS. 10a and 10b are, respectively, diagrammatic side and front elevational views showing an image bearing animation card at its beginning position prior to traveling upwardly during which an animation sequence of images is displayed.
Figure 10B:
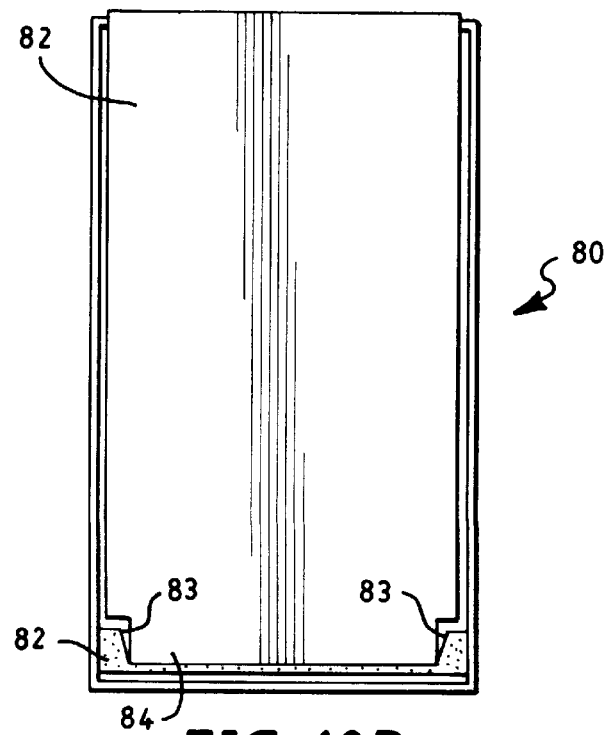

Bottom flange 72 (See FIG. 6b)is provided with a slot 83 through which a necked down section 84 (see FIG. 9b and 10b) of card 81 fits. The bottom edge of necked down portion of card 81 engages with foam block 92 so that, when a user pushes on card 81, foam block 82 deforms to assume the position illustrated in FIGS. 10a and 10b. When the top edge of card 81 is released, it is pushed very slowly from the position it has when foam block is in its deformed position of FIGS. 10a and 10b toward the position illustrated in FIG. 9a and 9b where foam block 82 has recovered from the manually applied deformation.

In the process of slowly moving between its two positions, the images on the card move by stationary horizontally oriented lenticules 86 to provide animated effects such as the dynamic image changes designated generally at 88 and 90 in FIGS. 7a and 7b, respectively. Depending on how the images are formed on card 81, the visual effects can illustrate one sequence of a repeating sequence of images. Again, this can take place on both sides or one side or the other and be coupled with stationary multi or 3D effects when in a rest position.

Alignment of the images here with the longitudinally extending axes of the lenticules is achieved by the fit between the width of card 81 and the lateral dimension between the inboard surfaces of spaced apart vertically extending flanges 70.

In practicing the foregoing embodiments, it must be kept in mind that such images must be aligned within acceptable visual tolerances with respect to the loci of focal lines of the lenticular surfaces, i.e., they must be flat over the area of visual interest, and must not be twisted, or tilted, with respect to the longitudinal axes of the lenticules. More particularly, image inserts such as cards flat within allowable tolerances on depth of field.

For a circle of confusion of about 0.005" (0.13 mm—visual acuity) and acrylic, this depth of focus is about plus or minus 0.008 inches (0.2 mm).

In addition to the need to have the image carrying cards flat with respect to the optics, it must also be parallel to the longitudinal axes of the lenticules to within limits or adverse visual effects can occur in the form of ripples that become apparent across the face of the viewed field. What has been found preferable is to keep the interlaced images parallel to the longitudinal axes of the lenticules to within 2 or less times the width of a single segment of an interlaced image resident behind a lenticule over the length of the art work of interest, and this holds true for both embodiments. Consequently, if the art work is long, this tolerance is more demanding than if it is short. However, what is interesting is that the art work can slide perpendicular to the lenticules without objectionable visual problems; one just sees the different views in different orders. Even so, the tilt must remain within the above limits to avoid rippling. This means that the edges of the card inserts must be straight to within this tolerance, or at least one of them used for registration must be straight, while the others may deliberately be skewed in the opposite direction to avoid any conflict in this regard. Interestingly, while the inserts can move in parallel fashion transverse to the longitudinal axes of the lenticules without introducing visual artifacts, so long as any tilt is kept within bounds, edges skewed in the direction opposite that of the reference can provide springiness in the plane of the insert to keep it in place perpendicular to the axes of the lenticules. Otherwise, the effect of slight movement in this plane is to simply change the order in which one sees the different views.

It should also be understood that it is not necessary to form the lenticulated wall sections of the invention as unitary structures integrated with structural walls themselves since it is within the teaching of the invention to attach separately formed lenticulated wall sections to otherwise smooth wall sections by using suitable adhesives or other means of attachment. Moreover, it will be understood that the lenticulated structures of the invention, including compensation for parallax effects, may be integrated with the front, back, and side wall surfaces along with interior surfaces, as well.

In addition, it should be clear that the displays of the inventive embodiments may be scaled up or down in size.

The images may be printed and interlaced on insert cards using commercially available software and suitable commercially available desk top printers such as ink jet printers or those using dye sublimation imaging materials.

Figure 17:
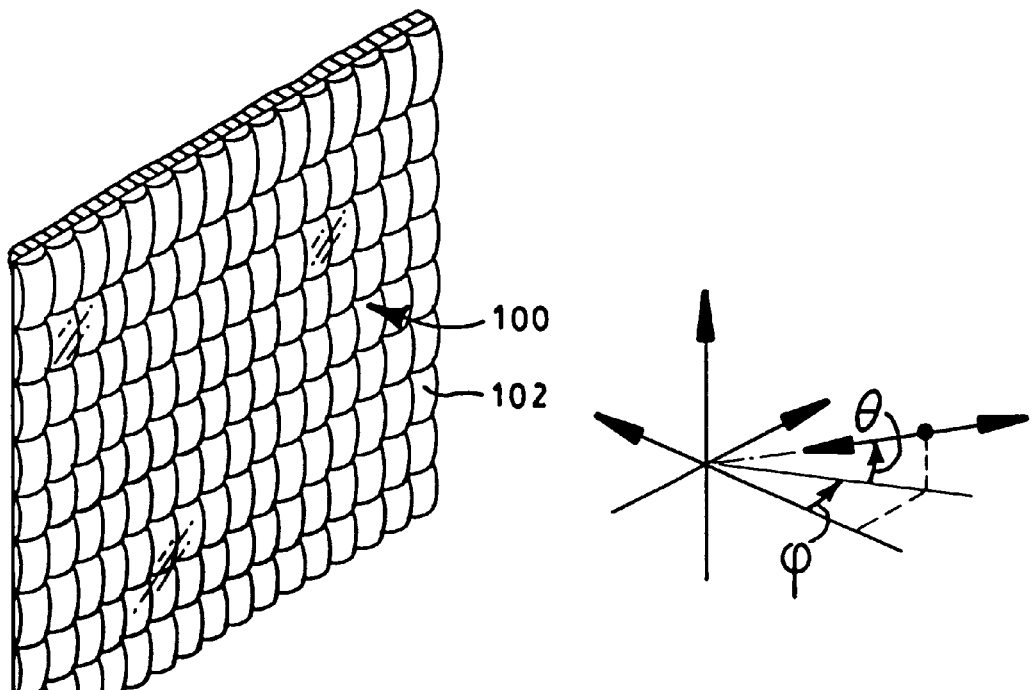
FIG. 17 is a diagrammatic perspective view of another preferred embodiment of an easel system of the invention having two dimensional optics.
Figure 18:
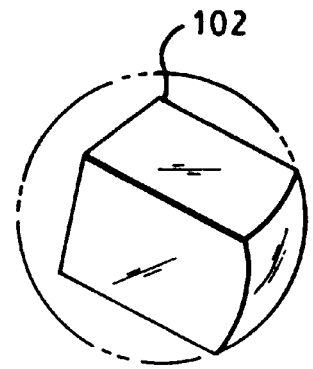
FIG. 18 is a diagrammatic, perspective view of lens element from the 2D optics of FIG. 17.

As shown in FIGS. 17 and 18 and as more particularly described in copending commonly owned U.S. Pat. No. 5,769,227 issued on Jun. 23, 1998, the contents of which are hereby incorporated by reference, the lenticulated screen of the inventive easels may also be comprised of two dimensional arrays of lenslets as designated generally at 100. An individual lenslet 102 having a generally rectangular shape is shown in FIG. 18. However, it will be realized that other suitable geometric shapes would be suitable to achieve desired optical effects.

Those skilled in the art may make other changes to the invention without departing from the scope of its teachings. For example, depending upon the type of foam employed to form the block 82 shown in FIGS. 7–10, it might in some cases be possible for the foam block to act as both the biasing means and the resilient means for moving the card 81 relative to the structural members. For this purpose, the spring 52 could be eliminated and a reshaped foam block placed below the graphic insert element 74, which could be provided with a slot to enable to necked-down section of the card 81 to contact the block 82. Other changes in the preferred embodiments of the invention described above will readily be apparent to those skilled in the art. Therefore, it is intended that the embodiments described herein be considered as illustrative and not be construed in a limiting sense.

What is claimed is:

1. An image easel system for presenting multiple images to an observer, said easel system comprising:

a printed insert card having formed thereon at least one pair of interlaced images;

a pair of structural members each of which includes a vertically extending panel having a leg section angularly dependent therefrom, said structural members having complementary configured means for pivotally mounting them with respect to one another for movement between an open extended position and a closed position, at least one of said panels including at least one transparent lenticulated section optically associated therewith, said pair of structural members further including means for aligning said interlaced images so that said images are in a plane substantially parallel to and in optical registration with said transparent lenticulated section, said insert card and said transparent lenticulated section being structured and arranged with respect to one another to provide different images to an observer looking at said transparent lenticulated section from different angular perspectives; and means for continuously biasing said structural members against one another so that they tend to remain in their closed position to retain said printed insert card in alignment with said transparent lenticulated section, wherein said means for continuously biasing said structural members against one another comprises biasing spring means having opposed ends contacting said leg sections of said pair of structural members and biasing said leg sections away from one another.

2. An image easel according to claim 1 wherein said complementary configured means for pivotally mounting the structural members are disposed adjacent the junction of said panel and said leg section of each of said pair of structural members so that in the closed position said panels lie substantially parallel and close to each other, but in the open extended position the ends of said panels remote from said leg sections are spaced form one another, thereby permitting said insert card to be removed from and replaced between the panels.

3. An image easel according to claim 1 wherein said complementary configured means for pivotally mounting said structural members comprise a pair of journals on one of said structural members and walls defining a pair of apertures in the other of said structural members, said pair of apertures being arranged to receive said pair of journals.

4. An image easel according to claim 1 wherein said aligning means comprises a flange provided on one of said panels so as to abut an edge of said insert card.

5. An image easel according to claim 4 wherein said flange extends substantially horizontally along an edge of one of said panels adjacent the leg section of the structural member carrying the flange.

6. An image easel according to claim 4 wherein said aligning means comprises at least one flange running an edge of one of said panels extending away from the leg section of the structural member carrying the flange.

7. An image easel according to claim 1 wherein each of said leg sections is provided with a groove arranged to receive one end of said biasing spring means.

8. An image easel according to claim 1 wherein said biasing spring means is provided with a depending leg section such that when said image easel is resting upon a flat surface with said structural members in their closed position and said leg sections resting upon said flat surface, said depending leg of said biasing spring means contacts said flat surface.

9. An image easel according to claim 1 further comprising a graphic insert element bearing at least one information-carrying indicium and having a shape and size such that when said structural members are in their closed position, said biasing spring means retains said graphic insert element adjacent said leg sections of said structural members.

10. An image easel according to claim 1 wherein said biasing means comprises a block of resilient material disposed between said leg sections of said pair of structural members and biasing said leg sections away from one another.

11. An image easel according to claim 1 wherein the lenticules of said transparent lenticulated section extend substantially horizontally, and said interlaced images on said printed insert card are such that upon moving said printed insert card vertically relative to said transparent lenticulated section, an observer viewing said printed insert card through said transparent lenticulated section sees an animated effect.

12. An image easel according to claim 11 wherein said aligning means comprises flange extends substantially horizontally along an edge of one of said panels adjacent the leg section of the structural member carrying the flange, said flange being arranged to abut the lower edge of said printed insert card, said flange being provided with a slot through which a necked down section of said printed insert card extends.

13. An image easel according to claim 12 further comprising a block of resilient material disposed between said leg sections of said pair of structural members and biasing said leg sections away from one another, said necked down section of said printed insert card contacting said block of resilient material such that upon downward movement of said printed insert card relative to said block of resilient material, said block will become compressed and after release of said printed insert card, said block will cause upward movement of said printed insert card relative to said structural members, thereby producing said animated effect.

14. An image easel according to claim 1 wherein said transparent lenticulated section comprises a two dimensional array of lenslets.

15. An image easel system, for use with a printed insert card bearing at least one pair of interlaced images, said easel system being used to present multiple images to an observer and comprising:

a pair of structural members each of which includes a vertically extending panel having a leg section angularly dependent therefrom, said structural members having complementary configured means for pivotally mounting them with respect to one another for movement between an open extended position and a closed position, at least one of said panels including at least one transparent lenticulated section optically associated therewith, said pair of structural members further including aligning means for contacting at least one edge of said card so that said images on said card are in a plane substantially parallel to and in optical registration with said transparent lenticulated section so as to provide different images to an observer looking at said transparent lenticulated section from different angular perspectives; and means for continuously biasing said structural members against one another so that they tend to remain in their closed position to retain said card in alignment with said transparent lenticulated section, wherein said means for continuously biasing said structural members against one another comprises biasing spring means having opposed ends contacting said leg sections of said pair of structural members and biasing said leg sections away from one another.

16. An image easel according to claim 15 wherein said complementary configured means for pivotally mounting the structural members are disposed adjacent the junction of the panel and the leg section of each of said pair of structural members so that in the closed position the panels lie substantially parallel and close to each other, but in the open extended position the ends of the panels remote from the leg sections thereof are spaced from one another, thereby permitting said insert card to be removed from and replaced between the panels.

17. An image easel according to claim 15 wherein said complementary configured means for pivotally mounting the structural members comprise a pair of journals on one of said structural members and walls defining a pair of aperture in the other of said structural members, said pair of apertures being arranged to receive said pair of journals.

18. An image easel according to claim 15 wherein said aligning means comprises a flange provided on one of said panels so as to abut an edge of said insert card.

19. An image easel according to claim 18 wherein said flange extends substantially horizontally along an edge of one of said panels adjacent the leg section of the structural member carrying the flange.

20. An image easel according to claim 18 wherein said aligning means comprises at least one flange running along an edge of one of said panels, said edge extending away from the leg sections of the structural member carrying the flange.

21. An image easel according to claim 15 wherein each of said leg sections is provided with a groove arranged to receive on end of said biasing spring means.

22. An image easel according to claim 15 wherein said biasing spring means is provided with a depending leg section such that when the image easel is resting upon a flat surface with said structural members in their closed position and said leg sections resting upon said flat surface, said depending leg of said biasing spring means contacts said flat surface.

23. An image easel according to claim 15 and intended for use with a printed insert card having a necked down section at one end, said image easel having the lenticules on said transparent lenticulated section extending substantially horizontally and having an aligning means comprising a flange extending substantially horizontally along an edge of one of said panels adjacent the leg section of the structural member carrying the flange, said flange being provided with a slot through which said necked down section of said printed insert card can extend.

24. An image easel according to claim 23 further comprising a block of resilient material disposed between said leg sections of said pair of structural members and biasing said leg sections away from one another, said block of resilient material lying adjacent said slot in said flange so that said necked down section of said printed insert card, when extending through said slot will contact said block of resilient material.

25. An image easel system, for use with a printed insert card bearing at least one pair of interlaced images, said easel system being used to present multiple images to an observer and comprising:

a pair of structural members each of which includes a vertically extending panel having a leg section angularly dependent therefrom, said structural members having complementary configured means for pivotally mounting them with respect to one another for movement between an open extended position and a closed position in which said leg sections serve as a base upon said image easel system may rest on a flat surface with said vertically extending panels oriented generally upright to the flat surface, at least one of said panels including at least one transparent lenticulated section optically associated therewith, said pair of structural members further including aligning means for contacting at least one edge of said card so that said images on said card are in a plane substantially parallel to and in optical registration with said transparent lenticulated section so as to provide different images to an observer looking at said transparent lenticulated section from different angular perspectives; and means for continuously biasing said structural members against one another so that they tend to remain in their closed position to retain said card in alignment with said tranparent lenticulated section.

* * * * *